(12) United States Patent
Shimizu et al.

(10) Patent No.: US 9,074,047 B2
(45) Date of Patent: *Jul. 7, 2015

(54) POLYCONDENSATION CATALYST FOR PRODUCING POLYESTER AND METHOD FOR PRODUCING THE SAME AND METHOD FOR PRODUCING POLYESTER

(75) Inventors: Hiromitsu Shimizu, Sakai (JP); Keiichi Tabata, Sakai (JP); Akihiro Kamon, Sakai (JP)

(73) Assignee: SAKAI CHEMICAL INDUSTRY CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/336,421

(22) Filed: Dec. 23, 2011

(65) Prior Publication Data

US 2012/0136133 A1    May 31, 2012

Related U.S. Application Data

(62) Division of application No. 12/733,250, filed as application No. PCT/JP2008/064860 on Aug. 14, 2008, now Pat. No. 8,247,345.

(30) Foreign Application Priority Data

Aug. 20, 2007  (JP) .................. 2007-214204

(51) Int. Cl.
- *B01J 23/00* (2006.01)
- *C08G 63/85* (2006.01)
- *B01J 21/06* (2006.01)
- *B01J 37/02* (2006.01)
- *B01J 37/03* (2006.01)
- *C08G 63/00* (2006.01)

(52) U.S. Cl.
CPC .............. *C08G 63/85* (2013.01); *B01J 21/063* (2013.01); *B01J 21/066* (2013.01); *B01J 23/007* (2013.01); *B01J 37/0221* (2013.01); *B01J 37/0244* (2013.01); *B01J 37/035* (2013.01)

(58) Field of Classification Search
CPC ........ B01J 21/063; B01J 37/03; B01J 37/033; B01J 37/035; B01J 21/066; B01J 23/007; B01J 37/0221; B01J 37/0244; B01J 35/06
USPC ................... 502/350, 351; 528/279
See application file for complete search history.

(56) References Cited

U.S. PATENT DOCUMENTS

2010/0041913 A1 * 2/2010 Umaba et al. ............... 560/202

FOREIGN PATENT DOCUMENTS

| JP | 2001-200045 | * | 7/2001 |
|---|---|---|---|
| JP | 2006-188567 | * | 7/2006 |
| JP | 2007-168840 | * | 5/2007 |
| JP | 2007-168840 |   | 7/2007 |
| JP | 2008/007588 |   | 1/2008 |
| WO | 2008/001473 |   | 1/2008 |
| WO | WO 2008/001473 | * | 1/2008 |

OTHER PUBLICATIONS

International Search Report issued Nov. 11, 2008 in International (PCT) Application No. PCT/JP2008/064860.

* cited by examiner

*Primary Examiner* — Ling Choi
*Assistant Examiner* — Gennadiy Mesh
(74) *Attorney, Agent, or Firm* — Wenderoth, Lind & Ponack, L.L.P.

(57) ABSTRACT

The invention provides a method for producing a catalyst for producing polyester by an esterification reaction or a transesterification reaction between a dicarboxylic acid or an ester-forming derivative thereof and a glycol, the method comprising hydrolyzing an organic titanium compound in an organic solvent in which particles of a solid base are dispersed thereby to form a coat layer of titanic acid on the surface of the particles of a solid base.

4 Claims, No Drawings

POLYCONDENSATION CATALYST FOR PRODUCING POLYESTER AND METHOD FOR PRODUCING THE SAME AND METHOD FOR PRODUCING POLYESTER

This application is a divisional application of U.S. Application Ser. No. 12/733,250, filed Feb. 19, 2010, now U.S Pat. No. 8,247,345, which is the national phase filing of International Patent Application No. PCT/JP2008/064860, filed Aug. 14, 2008.

TECHNICAL FIELD

The present invention relates to polycondensation catalysts for producing polyester and methods for producing the same, as well as methods for producing polyester.

BACKGROUND ART

Polyesters typified by polyethylene terephthalate, polybutylene terephthalate and polyethylene naphthalate excel in mechanical properties and chemical properties and are used in a wide variety of fields including fibers for clothes and industrial materials, films or sheets for packaging materials or magnetic tapes, bottles, which are hollow molded articles, casings of electric or electronic appliances, and other types of molded articles or components.

Certain representative polyesters, namely, polyesters composed of aromatic dicarboxylic acid components and alkylene glycol components as major constituents, such as polyethylene terephthalate, are produced by first preparing bis(2-hydroxyethyl)terephthalate (BHET) and an oligomer containing the same by an esterification reaction between terephthalic acid and ethylene glycol or transesterification of dimethyl terephthalate and ethylene glycol, and then subjecting them to melt-polycondensation in vacuo at high temperatures in the presence of a polycondensation catalyst.

As such a polycondensation catalyst for producing polyester, antimony trioxide is heretofore widely used as disclosed in JP-9-291141 A. Antimony trioxide is a catalyst which is inexpensive and is of excellent catalytic activity, however, it has some problems. For example, antimony metal is formed while it is used in polycondensation thereby making the resulting polyester darkened, or the resulting polyester is contaminated with foreign substances. In addition, antimony trioxide is inherently poisonous. In recent years, therefore, development of catalysts free of antimony has been awaited.

For example, a catalyst composed of a germanium compound is known as a catalyst which has an excellent catalytic activity and which can provide polyester excellent in hue and thermal stability. This catalyst, however, is problematic in that it is very expensive and that the catalyst content in a reaction system changes with time and it becomes difficult to control the polymerization because the catalyst is easily distilled off from the reaction system during the polymerization.

On the other hand, as disclosed in JP-46-3395 B, it is already known that titanium compounds such as glycol titanate also can be used as a polycondensation catalyst for producing polyester by transesterification of dimethyl terephthalate and ethylene glycol. Further, as disclosed in JP49-57092 B, for example, polycondensation catalysts comprising tetraalkoxy titanate are known. They, however, have problems in that the resulting polyester is liable to be colored due to thermal degradation during the melt-molding thereof.

In recent years, many methods for producing high-quality polyester at high productivity using a titanium compound as a polycondensation catalyst have been proposed. For example, as disclosed in JP 2001-064377 A and JP 2001-114885 A, a solid titanium compound obtained by first preparing a hydroxide of titanium by hydrolysis of titanium halide or titanium alkoxide and then dehydrating and drying the hydroxide by heating it at a temperature of from 30 to 350° C. has been proposed as a polycondensation catalyst.

However, according to the above-mentioned methods for producing the polycondensation catalysts, the catalysts are obtained by steps comprising drying and crushing, and as a result, the catalysts contain not a little aggregated particles. Such catalysts are poor in dispersibility in a reaction system so that there is a tendency that they fail to exhibit such catalyst performance that they originally possess, and the resulting polyester is liable to be colored due to thermal degradation during a melt-molding process. There is also a tendency that the resulting polyester is poor in transparency.

DISCLOSURE OF THE INVENTION

Problems to be Solved by the Invention

The present inventors have made intensive research in order to solve the above-mentioned problems involved in the conventional polycondensation catalysts for producing polyester. As a result, they have reached the present invention by finding that when a coat layer of titanic acid is formed on the surface of particles of a solid base by hydrolyzing an organic titanium compound in an organic solvent, preferably at least one selected from the group consisting of aliphatic monohydric alcohols and aliphatic dihydric alcohols, in which the particles of a solid base have been dispersed, thereby to form a coat layer of titanic acid on the surface of the particles of a solid base, and such a product is used as a polycondensation catalyst for producing polyester, decomposition of polyester is controlled during the production of polyester and high-molecular-weight polyester is formed at a high polymerization activity per unit weight of metal element (titanium) which constitutes the catalyst, and the resulting polyester hardly suffers coloring due to thermal degradation during the melt-molding.

Therefore, it is an object of the invention to provide a method for producing a polycondensation catalyst for producing polyester which exhibit high catalytic activity and provide polyester with excellent hue or color tone and transparency even in the absence of antimony. It is also an object of the invention to provide such a polycondensation catalyst and a method for producing polyester using such a polycondensation catalyst.

Means to Solve the Problems

The invention provides a method for producing a catalyst for producing polyester by an esterification reaction or a transesterification reaction between a dicarboxylic acid or an ester-forming derivative thereof and a glycol, the method comprising hydrolyzing an organic titanium compound in an organic solvent in which particles of a solid base are dispersed thereby to form a coat layer of titanic acid on the surface of the particles of a solid base. This method is hereunder referred to as the first method of the invention.

The invention further provides a method for producing a catalyst for producing polyester by an esterification reaction or a transesterification reaction between a dicarboxylic acid or an ester-forming derivative thereof and a glycol, the method comprising hydrolyzing an organic silicon compound and/or an organic aluminum compound and/or an organic zirconium compound in an organic solvent in which particles of a solid base are dispersed thereby to form an inner coat layer either of an oxide of at least one element selected from silicon, aluminum and zirconium or of a composite oxide of at least two elements selected from silicon, aluminum and zirconium on the surface of the particles of a solid base, and then hydrolyzing an organic titanium compound in the organic solvent in which the particles of a solid base having the inner coat layer thereon are dispersed thereby to form an outer coat layer of titanic acid on the inner coat layer of the particles of a solid base. This method is hereunder referred to the second method of the invention.

According to the invention, the solid base is preferably magnesium hydroxide or hydrotalcite. Further according to the invention, the organic solvent is preferably at least one selected from the group consisting of aliphatic monohydric alcohols and aliphatic dihydric alcohols, and most preferably the organic solvent is ethylene glycol.

The invention also provides a catalyst for producing polyester by an esterification reaction or a transesterification reaction between a dicarboxylic acid or an ester-forming derivative thereof and a glycol, the catalyst being obtainable by hydrolyzing an organic titanium compound in an organic solvent in which particles of a solid base are dispersed thereby to form a coat layer of titanic acid on the surface of the particles of a solid base.

The invention further provides a catalyst for producing polyester by an esterification reaction or a transesterification reaction between a dicarboxylic acid or an ester-forming derivative thereof and a glycol, the catalyst being obtainable by hydrolyzing an organic silicon compound and/or an organic aluminum compound and/or an organic zirconium compound in an organic solvent in which particles of a solid base are dispersed thereby to form an inner coat layer either of an oxide of at least one element selected from silicon, aluminum and zirconium or of a composite oxide of at least two elements selected from silicon, aluminum and zirconium on the surface of the particles of a solid base, and then hydrolyzing an organic titanium compound in the organic solvent in which the particles of a solid base having the inner coat layer thereon are dispersed thereby to form an outer coat layer of titanic acid on the inner coat layer of the particles of a solid base.

In addition, the invention provides a method for producing polyester comprising preparing an oligomer comprising a bis(hydroxyalkyl) ester of an aromatic dicarboxylic acid by an esterification reaction or a transesterification reaction of the aromatic dicarboxylic acid or an ester-forming derivative thereof and an alkylene glycol, and then melt-polycondensing the oligomer in the presence of the polycondensation catalyst mentioned above.

Effect of the Invention

According to the method of the invention, a polycondensation catalyst for producing polyester is obtained in the form of a dispersion composed of a solvent and the polycondensation catalyst dispersed therein from the first. In particular, when ethylene glycol is used as the solvent, the catalyst obtained can be used as it is for polycondensation reaction for production of polyester in which ethylene glycol is one of the raw materials used. Moreover, the use of the catalyst obtained by the method of the invention makes it possible to obtain a high-molecular-weight polyester excellent in hue and transparency at a high polymerization activity without making the polyester darkened or contaminating the polyester with foreign substances or causing decomposition of the polyester during the production of polyester.

BEST MODE FOR CARRYING OUT THE INVENTION

According to the invention, there are mentioned, as a solid base, oxides or hydroxides of an alkali metal and an alkaline earth metal, including a variety of composite oxides thereof, oxides of aluminum, zinc, lanthanum, zirconium, thorium, among others, and composite oxides thereof oxides. A part of these oxides and composite oxides may be substituted with a salt such as a carbonate. Accordingly, the solid base preferably used in the invention includes oxides and hydroxides of magnesium, calcium, strontium, barium, aluminum and zinc, and example of such oxides and hydroxides include, for example, magnesium hydroxide, calcium oxide, strontium oxide, barium oxide, zinc oxide, and a composite oxide such as hydrotalcite. Among these, magnesium hydroxide or hydrotalcite is particularly preferred.

Particles of magnesium hydroxide are obtained, for example, by neutralizing an aqueous solution of a water-soluble magnesium salt such as magnesium chloride or magnesium nitrate with an alkali such as sodium hydroxide or ammonia thereby precipitating magnesium hydroxide. When particles of magnesium hydroxide are obtained by neutralizing an aqueous solution of a water-soluble magnesium salt with an alkali in this way, the aqueous solution of a water-soluble magnesium salt and an alkali may be neutralized at the same time, or one of them may be added to the other.

The particles of magnesium hydroxide may be derived from any source. For example, they may be powder obtained by pulverizing natural ore or powder obtained by neutralizing an aqueous magnesium salt solution with an alkali.

The hydrotalcite used in the invention is preferably represented by the following general formula (I)

$$M^{2+}_{1-x}M^{3+}_x(OH^-)_2 A^{n-}_{x/n} \cdot mH_2O \qquad (I)$$

wherein $M^{2+}$ denotes at least one divalent metal ion selected from $Mg^{2+}$, $Zn^{2+}$ and $Cu^{2+}$; $M^{3+}$ denotes at least one trivalent metal ion selected from $Al^{3+}$, $Fe^{3+}$ and $Ti^{3+}$; $A^{n-}$ denotes at least one anion selected from $SO_4^{2-}$, $Cl^-$, $CO_3^{2-}$ and $OH^-$; n denotes the valence of the anion; x is a number satisfying the condition $0<x<0.5$; and m is a number satisfying the condition $0 \leq m<2$.

In particular, the hydrotalcite preferably used in the invention is such hydrotalcite in which $M^{2+}$ is $Mg^{2+}$, $M^{3+}$ is $Al^{3+}$ and $A^{n-}$ is $CO_3^{2-}$, i.e., such hydrotalcite represented by the general formula (II) is preferably used:

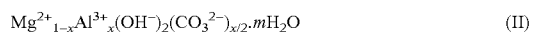

$$Mg^{2+}_{1-x}Al^{3+}_x(OH^-)_2(CO_3^{2-})_{x/2} \cdot mH_2O \qquad (II)$$

wherein x and m have meanings the same as those mentioned above. Although such a hydrotalcite can be obtained easily as a product in the market, it can also be produced, if necessary, by a conventionally known method, e.g. a hydrothermal method, using proper materials.

A coat layer of titanic acid is formed on the surface of the particles of a solid base in an organic solvent, i.e., a reaction solvent, according to the first method of the invention, and an inner coat layer either of an oxide of at least one element selected from silicon, aluminum and zirconium or of a composite oxide of at least two elements selected from silicon, aluminum and zirconium, and then an outer coat layer of titanic acid on the inner coat layer of the particles of a solid base are formed in an organic solvent, i.e., a reaction solvent, according to the second method of the invention. According to the invention, the organic solvent is at least one selected from the group consisting of aliphatic monohydric alcohols and aliphatic dihydric alcohols.

The aliphatic monohydric alcohol is preferably represented by the general formula (I)

$$R_1\text{—OH}$$

in which $R_1$ is an alkyl group of 1-4 carbon atoms. Accordingly, examples of such aliphatic monohydric alcohols include, for example, methyl alcohol, ethyl alcohol, propyl alcohol, isopropyl alcohol, and butyl alcohol.

On the other hand, the aliphatic dihydric alcohol is preferably represented by the general formula (II)

$$HO\text{—}R_2\text{—}OH$$

in which $R_2$ is an alkylene group of 1-4 carbon atoms. Accordingly, examples of such aliphatic dihydric alcohols include, for example, ethylene glycol, propylene glycol, trimethylene glycol, and tetramethylene glycol.

The polycondensation catalyst of the invention is obtained in the form of a dispersion composed of an organic solvent and the catalyst well dispersed therein. As the organic solvent, an aliphatic dihydric alcohol is preferred, and ethylene glycol is most preferred. However, the organic solvent is not specifically limited to those as exemplified above.

In the invention, titanic acid is a hydrated titanium oxide represented by the general formula $$TiO_2 \cdot nH_2O$$

wherein n is a number satisfying the condition $0 < n \leq 2$. Such a titanic acid can be obtained, for example, by hydrolysis of a certain kind of titanium compound as described later.

The first method of the invention comprises hydrolyzing an organic titanium compound in an organic solvent in which particles of a solid base are dispersed thereby to form a coat layer of titanic acid on the surface of the particles of a solid base, thereby providing a catalyst for producing polyester by an esterification reaction or a transesterification reaction between a dicarboxylic acid or an ester-forming derivative thereof and a glycol.

The organic titanium compound used is not specifically limited so long as it has a hydrolysable organic group. Thus, it is not limited to specific ones, but titanium tetraalkoxide is preferably used among others. Some examples of the titanium tetraalkoxide usable include, for example, tetraisopropyl titanate, tetrabutyl titanate, tetracyclohexyl titanate, and tetraphenyl titanate.

Means and methods to hydrolyze the organic titanium compound are also not specifically limited, but it is readily hydrolyzed by reaction with water.

When the organic titanium compound is hydrolyzed with water, the amount of water is such that it is enough to hydrolyze the organic group that the organic titanium compound has. Because the valence of titanium in an organic titanium compound is four, the theoretical amount of water necessary to hydrolyze the organic titanium compound is four times in moles the amount of the organic titanium compound used. Thus, in the invention, the amount of water used to hydrolyze the organic titanium compound should be usually four times in moles the amount of the organic titanium compound used or more. However, if water is used in an excessive amount, the amount of water remained in the obtained dispersion of polycondensation catalyst increases needlessly. Accordingly, water is usually used in an amount four times in moles the amount of the organic titanium compound used.

According to the first method of the invention, it is preferred that particles of a solid base are dispersed in an organic solvent, and while the resulting mixture is maintained at a temperature of 5-100° C., preferably at a temperature of 25-85° C., an organic titanium compound in an amount of 0.1-50 parts by weight in terms of $TiO_2$ in relation to 100 parts by weight of the solid base and water are added to the mixture, and if necessary, an acid catalyst or a base catalyst is further added thereto, thereby the organic titanium compound is hydrolyzed to form a coat layer of titanic acid on the surfaces of particles of the solid base. In this way, the polycondensation catalyst of the invention for producing polyester is obtained in the form of a dispersion in which the organic solvent is a dispersion medium. According to such a method as mentioned above, the particles of a solid base which have a coat layer formed of titanic acid in an amount of 0.1-50 parts by weight in terms of $TiO_2$ in relation to 100 parts by weight of the particles of a solid base are obtained. As the acid catalysis for the hydrolysis, nitric acid or acetic acid is used, for example, and as the alkali catalyst, ammonia is used, when necessary.

The polycondensation catalyst for producing polyester obtained in this way is referred hereunder to the first polycondensation catalyst of the invention. In the first polycondensation catalyst of the invention, when the amount of the coat layer of titanic acid is less than 0.1 parts by weight in terms of $TiO_2$ per 100 parts by weight of the solid base, the resulting polycondensation catalyst has a low polymerization activity and fails to provide high-molecular-weight polyester with a satisfactory productivity. On the other hand, when the amount of the coat layer of titanic acid is more than 50 parts by weight in terms of $TiO_2$ per 100 parts by weight of the solid base, decomposition of polyester occurs easily during production of the polyester and coloring of the resulting polyester due to its thermal degradation occurs easily during melt-molding of the polyester.

The second method of the invention comprises hydrolyzing an organic silicon compound and/or an organic aluminum compound and/or an organic zirconium compound in an organic solvent in which particles of a solid base are dispersed thereby to form an inner coat layer either of an oxide of at least one element selected from silicon, aluminum and zirconium or of a composite oxide of at least two elements selected from silicon, aluminum and zirconium on the surface of the particles of a soli base, and then hydrolyzing an organic titanium compound in the organic solvent in which the particles of a solid base having the inner coat layer thereon are dispersed thereby to form an outer coat layer of titanic acid on the inner coat layer of the particles of a solid base, thereby providing a catalyst for producing polyester by an esterification reaction or a transesterification reaction between a dicarboxylic acid or an ester-forming derivative thereof and a glycol.

The organic silicon compound, the organic aluminum compound and the zirconium compound used are not specifically limited so long as they have hydrolysable organic groups. However, by way of example, it is preferred that tetraethyl orthosilicate is used as the organic silicon compound; aluminum isopropoxide or aluminum secondary butoxide as the organic aluminum compound; and zirconium n-propoxide or zirconium n-butoxide.

Also in the second method of the invention, means and methods to hydrolyze the organic silicon compound, the organic aluminum compound or the organic zirconium compound are also not specifically limited, but these organic metal compounds are readily hydrolyzed by reaction with water in the same manner as the organic titanium compound mentioned hereinbefore.

When the organic silicon compound, the organic aluminum compound or the organic zirconium compound is hydrolyzed with water, the amount of water is such that it is enough to hydrolyze the organic group of the organic metal compounds that they have. The theoretical amount of water necessary to hydrolyze the organic silicon compound or the organic zirconium compound is four times in moles the amount of the organic metal compound used. Thus, in the invention, the amount of water to be used to hydrolyze the organic silicon compound or the organic zirconium compound should be usually four times in moles the amount of the organic metal compound used or more. In the same manner, the theoretical amount of water necessary to hydrolyze the organic aluminum compound is three times in moles the amount of the organic aluminum compound used. Thus, in the invention, the amount of water to be used to hydrolyze the organic aluminum compound should be usually three times in moles the amount of the organic metal compound used or more. However, in the case of any organic metal compounds, even if water is used in an excessive amount, the amount of water remained in the obtained dispersion of polycondensation catalyst increases needlessly. Accordingly, in the case of the organic silicon compound and the organic zirconium compound, water is usually used in an amount four times in moles the amount of the organic metal compound, and in the case of the organic aluminum compound, water is usually used in an amount three times in moles the amount of the organic metal compound used.

According to the second method of the invention, it is preferred that particles of a solid base are dispersed in such an organic solvent as mentioned above, and while the resulting mixture is maintained at a temperature of 5-100° C., preferably at a temperature of 25-85° C., an organic silicon compound in an amount of 1-20 parts by weight in terms of $SiO_2$ in relation to 100 parts by weight of the solid base and/or an organic aluminum compound in an amount of 1-20 parts by weight in terms of $Al_2O_3$ in relation to 100 parts by weight of the solid base and/or an organic zirconium compound in an amount of 1-20 parts by weight in terms of $ZrO_2$ in relation to 100 parts by weight of the solid base and water, if necessary, together with such an acid catalyst or an alkali catalyst that are described hereinbefore, are added to the mixture so as to hydrolyze the organic silicon compound and/or the organic aluminum compound and/or the organic zirconium compound, thereby forming an inner coat layer either formed of an oxide of at least one element selected from silicon, aluminum and zirconium or of a composite oxide of at least two elements selected from silicon, aluminum and zirconium on the surfaces of particles of a solid base, and then an outer coat layer is formed on such particles of a solid base thus having the inner coat layer in the same manner as the first method of the invention described hereinabove. The polycondensation catalyst for producing polyester is obtained in this way according to the invention.

That is, the inner coat layer is formed either of an oxide of at least one element selected from silicon, aluminum and zirconium or of a composite oxide of at least two elements selected from silicon, aluminum and zirconium on the surface of particles of a solid base in an organic solvent, and then while the organic solvent is maintained at a temperature of 5-100° C., preferably at a temperature of 25-85° C., an organic titanium compound in an amount of 0.1-50 parts by weight in terms of $TiO_2$ in relation to 100 parts by weight of the solid base and water are added to the mixture, and if necessary, an acid catalyst or a base catalyst is further added to the mixture, thereby the organic titanium compound is hydrolyzed to form an outer coat layer of titanic acid on the inner coat layer of the particles of a solid base.

As mentioned hereinbefore, a first organic solvent is used when an inner coat layer is formed on particles of a solid base and a second organic solvent is used when an outer layer coat is formed on the inner coat layer by hydrolyzing an organic titanium compound. The second organic solvent is not necessarily the same as the first organic solvent.

In this way, there is obtained a polycondensation catalyst for producing polyester in the form of a dispersion which is composed of an organic solvent and particles of a solid base having 1-20 parts by weight of inner coat layer either of an oxide of at least one element selected from silicon, aluminum and zirconium or of a composite oxide of at least two elements selected from silicon, aluminum and zirconium in relation to 100 parts by weight of the solid base, and 0.1-50 parts by weight of outer coat layer formed of titanic acid on the inner coat layer of the particles of a solid base in relation to 100 parts by weight of the solid base.

The polycondensation catalyst for producing polyester obtained in this way is hereunder referred to as the second catalyst for producing polyester. When the second catalyst has an inner coat layer formed of either of an oxide of at least one element selected from silicon, aluminum and zirconium or of a composite oxide of at least two elements selected from silicon, aluminum and zirconium in an amount less than one part by weight in relation to 100 parts by weight of the solid base, the catalyst has a high polycondensation activity, however, the resulting polyester is not improved in hue. When the amount of inner coat layer is more than 20 parts by weight in relation to 100 parts by weight of the solid base, the resulting catalyst has undesirably a low catalytic activity.

On the other hand, when the amount of outer coat layer is less than 0.1 parts by weight in terms of $TiO_2$ in relation to 100 parts by weight of the solid base, the resulting catalyst has a low catalytic activity so that it fails to provide high molecular weight polyester in a high productivity. When the amount of outer coat layer is more than 50 parts by weight in terms of $TiO_2$ in relation to 100 parts by weight of the solid base, it often happens that the resulting polyester decomposes during polycondensation, and in addition, it often happens that the resulting polyester is colored due to thermal deterioration during melt molding.

The method for producing polyester according to the invention comprises conducting an esterification reaction or a transesterification reaction between a dicarboxylic acid or an ester-forming derivative thereof and a glycol in the presence of the first or the second polycondensation catalyst described above. According to the invention, either the first or the second polycondensation catalyst is obtained in the form of a dispersion composed of an organic solvent and the catalyst dispersed therein so that the catalyst can be used for the polycondensation reaction as it is or after it is diluted to an appropriate concentration.

In the invention, examples of the dicarboxylic acid include aliphatic dicarboxylic acids exemplified by succinic acid, glutaric acid, adipic acid and dodecanedicarboxylic acid and their ester-forming derivatives such as dialkyl esters; and aromatic dicarboxylic acids exemplified by terephthalic acid, isophthalic acid and naphthalene dicarboxylic acid and their ester-forming derivatives such as dialkyl esters. In the present invention, examples of the glycol include ethylene glycol, propylene glycol, diethylene glycol, triethylene glycol, butylene glycol and 1,4-cyclohexanedimethanol.

Among the examples provided above, for example, aromatic dicarboxylic acids such as terephthalic acid, isophthalic acid and naphthalene dicarboxylic acid are preferably used as the dicarboxylic acid; and alkylene glycols such as ethylene glycol, propylene glycol and butylene glycol are preferably used as the glycol.

Therefore, in the invention, specific examples of preferred polyesters include polyethylene terephthalate, polybutylene terephthalate, polypropylene terephthalate, polyethylene naphthalate, polybutylene naphthalate, polypropylene naphthalate and poly(1,4-cyclohexane dimethylene terephthalate).

In the present invention, however, the neither dicarboxylic acid or its ester-forming derivative nor the glycol or its ester-forming derivative is limited to the examples listed above. Further, the resulting polyester is not limited to the examples shown above.

In general, polyester represented by polyethylene terephthalate has been produced by any of the following methods: a method comprising producing a low-molecular-weight oligomer containing the aforementioned BHET by a direct esterification of a dicarboxylic acid represented by terephthalic acid and a glycol represented by ethylene glycol, and subjecting the oligomer to melt-polycondensation in the presence of a polycondensation catalyst under a high vacuum at a high temperature to yield polyester with a desired molecular weight; and a method comprising producing, like the foregoing method, a low-molecular-weight oligomer containing the aforementioned BHET by a transesterification of a dialkyl terephthalate represented by dimethyl terephthalate and a glycol represented by ethylene glycol, and subjecting the oligomer to melt-polycondensation in the presence of a polycondensation catalyst under a high vacuum at a high temperature to yield polyester with a desired molecular weight.

Also in the invention, polyester having a desired molecular weight can be obtained by producing a low-molecular-weight oligomer containing the foregoing BHET by the above-mentioned direct esterification reaction or transesterification reaction, and then subjecting the oligomer to melt-polycondensation in the presence of the first or the second polycondensation catalyst of the invention under a high vacuum at a high temperature in the conventionally known manner as described above.

For example, polyethylene terephthalate is produced as follows. In accordance with an ordinary method, as conventionally known, a low-molecular-weight oligomer containing BHET can be obtained by feeding dimethyl terephthalate and ethylene glycol together with a catalyst such as calcium acetate into a reactor, heating them under a normal pressure to react them together at a reflux temperature while distilling off methanol from the reaction system. The degree of polymerization of the oligomer is usually up to about 10. If necessary, the reaction may be conducted under pressure. The reaction can be traced by measuring the amount of methanol distilled. The esterification ratio is usually about 95%.

When a direct esterification reaction is employed, a low-molecular-weight oligomer containing BHET can be obtained by feeding terephthalic acid and ethylene glycol into a reactor and heating them, if necessary under pressure, while distilling off the water formed. In the direct esterification reaction, it is preferable to add a previously prepared low-molecular-weight oligomer containing BHET together with raw materials into a reactor and carry out the direct esterification reaction in the presence of the low-molecular-weight oligomer.

Subsequently, the thus obtained low-molecular-weight oligomer is transferred to a polymerization reactor and is heated under reduced pressure to a temperature not lower than the melting point of polyethylene terephthalate (typically 240 to 280° C.). Thus, the oligomer is subjected to melt-polycondensation while unreacted ethylene glycol and ethylene glycol resulting from the reaction are distilled off from the reaction system under monitoring of the viscosity of the molten reactants. According to necessity, the polycondensation reaction may be carried out by using a plurality of reactors and changing the reaction temperature and pressure optimally in each reactor. When the viscosity of the reaction mixture reaches a predetermined value, the pressure reduction is stopped and the pressure in the polymerization reactor is returned to a normal pressure with nitrogen gas. Then, the resulting polyester is discharged from the reactor, for example, in the form of strand, cooled in water, and cut to form pellets. According to the invention, polyester having an intrinsic viscosity [η] of from 0.4 to 1.0 dL/g can be obtained in this way.

The first or second polycondensation catalysts for producing polyester of the invention may be added to a reaction system when direct esterification reaction or transesterification reaction for the production of the oligomer containing BHET is carried out, or alternatively may be added to the reaction system when a low-molecular-weight oligomer is further subjected to polycondensation reaction after the oligomer is obtained. As mentioned above, the polycondensation catalyst of the invention is obtained in the form of a dispersion composed of a solvent such as ethylene glycol and the catalyst dispersed therein, and accordingly the catalyst can be added to a reaction system as it is or after it is diluted appropriately. According to the invention, in particular, such a catalyst in the form of a dispersion composed of a solvent such as ethylene glycol and the catalyst dispersed therein is preferably added to a reaction system when direct esterification reaction or transesterification reaction for the production of the oligomer containing BHET is carried out.

Either the first or the second polycondensation catalyst of the invention is used usually in an amount within the range of from $1\times10^{-5}$ to $1\times10^{-1}$ parts by mol per 100 parts by mol of the dicarboxylic acid used or its ester-forming derivative. When the amount of the polycondensation catalyst of the invention is less than $1\times10^{-5}$ parts by mol per 100 parts by mol of the dicarboxylic acid used or its ester-forming derivative, the catalyst activity is not high enough and therefore it may be impossible to obtain desired high-molecular-weight polyester. On the other hand, when it is more than $1\times10^{-1}$ parts by mol, the resulting polyester may be poor in thermal stability.

The polycondensation catalyst of the invention exhibit catalyst activity in solid state polymerization and solution polymerization as well as melt polymerization. In each case, therefore, the catalyst can be used for the production of polyester.

The polycondensation catalysts of the invention contain no antimony as an ingredient. Therefore, it does not make resulting polyesters darkened or it does not contaminate resulting polyesters as foreign substances. In addition, it has catalyst activity equal to or higher than those of catalysts containing antimony as an ingredient and can provide polyesters with excellent hue and transparency. Moreover, the polycondensation catalyst of the invention is not poisonous and hence safe.

According to the invention, in particular, the polycondensation catalyst of the invention is obtained from the first in the form of a dispersion composed of a solvent and the catalyst dispersed therein. Thus, the catalyst can be added to a reaction system as it is or after it is diluted to an appropriate concentration.

In the production of polyester by an esterification reaction or transesterification reaction of a dicarboxylic acid or its ester-forming derivative and a glycol, it is presumed that the acidic catalysis of titanic acid is to coordinate, as a Lewis acid, to a carbonyl group of a dicarboxylic acid or its ester-forming derivative to make the attack of the glycol to the carbonyl carbon easy and simultaneously accelerate the dissociation of glycol to increase the nucleophilicity thereof. However, when the acidic catalysis is too strong, undesirable side reactions probably occur to cause a decomposition reaction or coloration of the resulting polyester.

It is presumed that since the polycondensation catalyst of the invention has a coat layer formed of titanic acid on the surface of particles of a solid base, i.e., magnesium hydroxide or hydrotalcite, the acidic catalysis of the titanic acid is rendered moderate, and as a result, high-molecular-weight polyester excellent in hue and transparency is obtained.

Further according to the invention, since the second polycondensation catalyst has an inner coat layer either of an oxide of at least one element selected from silicon, aluminum and zirconium or of a composite oxide of at least two elements selected from silicon, aluminum and zirconium and an outer coat layer of titanic acid on the surface of particles of a solid base, and it is presumed that excessive catalysis of the solid base is suppressed while the acidic catalysis of titanic acid is further improved and, as a result, high-molecular-weight polyester more excellent in hue and more transparency is obtained.

However, any conventionally known polycondensation catalyst such as compounds of antimony, germanium, titanium, tin or aluminum may be used together with the polycondensation catalyst of the invention in the production of polyester unless the merit of use of the polycondensation catalyst of the invention is affected. In addition, if necessary, an alkali metal compound may be used together with the polycondensation catalyst of the invention, or a phosphorus compound may be used together with the polycondensation catalyst of the invention for the purpose of improvement of heat stability.

EXAMPLES

The invention is now described with reference to examples below; however, the invention is not limited to those examples. In the following Examples and Comparative Examples, the intrinsic viscosity of polyester obtained was measured in accordance with ISO 1628-1, and the hue was measured using a 45° diffusion type color difference meter (SC2-CH, manufactured by Suga Test Instruments Co., Ltd.). The haze value of polyester obtained was measured at 5-mm thick portion of a rectangular plate with steps according to JIS K-7136.

The sedimentation rate η of a dispersion of polycondensation catalyst obtained was measured as follows. A predetermined amount of the dispersion of catalyst was placed and stood in a 50 cc capacity test tube for 30 days, and then the height of the resulting supernatant in the test tube was measured. The height of the supernatant of the dispersion was divided by the height of the surface of the dispersion from the bottom of the test tube when the test was started, and the obtained value was taken as the sedimentation rate. That is, η=height of the supernatant (cm)÷height of the surface of the dispersion from the bottom of the test tube when the test was started (cm)×100.

Δb was measured as follows. A polyester to be tested was placed in a hot air drying oven at a temperature of 205° C. for 16 hours, and Δb was measured based on change of hue (b value) before and after the test.

Production of Magnesium Hydroxide and Hydrotalcite

Reference Example 1

Preparation of Magnesium Hydroxide

5 L of water was placed in a reactor, and then 16.7 L of 4 mol/L aqueous solution of magnesium chloride and 8.4 L of 14.3 mol/L aqueous solution of sodium hydroxide were added simultaneously thereto with stirring. Thereafter, a hydrothermal reaction was conducted at 170° C. for 0.5 hours. The thus obtained magnesium hydroxide was collected by filtration, washed with water, and dried, to provide magnesium hydroxide.

Reference Example 2

Preparation of Hydrotalcite

A mixed solution of 2.6 L of 3.8 mol/L aqueous solution of magnesium sulfate and 2.6 L of 0.85 mol/L aqueous solution of aluminum sulfate and a mixed solution of 2.8 L of 9.3 mol/L aqueous solution of sodium hydroxide and 2.6 L of 2.54 mol/L aqueous solution of sodium carbonate were added simultaneously to a reactor with stirring, and then a hydrothermal reaction was conducted at 180° C. for 2 hours. After completion of the reaction, the resulting slurry was filtered, and the obtained solid was washed with water, dried and pulverized to provide hydrotalcite having a composition $Mg_{0.7}Al_{0.3}(OH)_2(CO_3)_{0.15} \cdot 0.48H_2O$.

Preparation of First Polycondensation Catalysts and Examples of Production of Polyester Using the Catalysts Example 1

Preparation of Polycondensation Catalyst A 1107 g of magnesium hydroxide obtained in Reference Example 1 was dispersed in 2.5 L of ethylene glycol maintained at a temperature of 75-85° C. to provide a dispersion. 395.0 g of titanium tetraisopropoxide ($Ti(OC_3H_7)_4$) was dropwise added to the dispersion with stirring over a period of 2 hours. After the addition, the resulting mixture was aged for one hour to provide a solution. Subsequently, 100 g of water, an amount four times in moles the amount of the titanium tetraisopropoxide, was added to the solution, followed by aging for 4 hours, thereby providing a dispersion of particles of magnesium hydroxide having a coat layer thereon (polycondensation catalyst A) in the ethylene glycol according to the invention.

The proportion of the polycondensation catalyst in the ethylene glycol dispersion was 30 parts by weight per 100 parts by weight of the ethylene glycol dispersion. The sedimentation rate of this ethylene glycol dispersion is shown in Table 1. The proportion of coat of titanic acid in the polycondensation catalyst was 10 parts by weight in terms of $TiO_2$ per 100 parts by weight of magnesium hydroxide.

Production of Polyester a 13.6 g (0.070 mol) of dimethyl terephthalate, 10.0 g (0.16 mol) of ethylene glycol, 0.022 g of calcium acetate dihydrate and 0.0045 g of ethylene glycol dispersion of polycondensation catalyst A (0.00135 g as polycondensation catalyst, i.e., 2.1×10⁻⁵ mol; 0.03 parts by mole per 100 parts by mole of dimethyl terephthalate) were placed in a glass reactor with a side pipe. Then, a part of the reactor was soaked in an oil bath at 197° C. so that the dimethyl terephthalate was dissolved in the ethylene glycol. A capillary was inserted into a reaction tube so that it reached the bottom of the reactor. While distilling most of resulting methanol by blowing nitrogen into the reactor for 1 hour using this capillary, heating was continued for 2 hours to yield an oligomer containing BHET.

Subsequently, when the resulting reaction mixture was heated at 222° C. for 15 minutes, ethylene glycol started to be distilled and polycondensation started. Thereafter, the temperature was increased to 283° C. When this temperature was maintained, ethylene glycol was further distilled and the polycondensation progressed. Ten minutes later, the reduction of pressure was started and the pressure was reduced to 27 Pa or lower over 15 minutes. Then, the polycondensation was terminated in 3 hours. After the termination of the polycondensation reaction, the pressure in the reactor was returned to normal pressure with nitrogen gas. The resulting polyester was discharged in a strand form through an outlet opening at the bottom of the reactor. The strand was cooled and cut, yielding polyester pellets. The intrinsic viscosity, hue, haze value and Δb of the thus obtained polyester are shown in Table 1.

Example 2

Production of Polyester b 43 g (0.26 mol) of terephthalic acid and 19 g (0.31 mol) of ethylene glycol were placed in a reactor and stirred under a nitrogen atmosphere to prepare a slurry. An esterification reaction was performed over 4 hours while the temperature in the reactor was kept at 250° C. and the relative pressure based on the atmospheric pressure was kept at 1.2×10⁵ Pa. 50 g of the thus obtained low-molecular weight oligomer was transferred to a polycondensation reactor held at 250° C. and normal pressure under a nitrogen gas atmosphere.

0.0083 g of ethylene glycol dispersion of polycondensation catalyst A (0.0025 g as polycondensation catalyst, i.e., 3.9×10⁻⁵ mol; 0.015 parts by mole per 100 parts by mole of terephthalic acid component used in polycondensation) was dispersed in ethylene glycol to prepare a slurry, and this slurry was added to the polycondensation reactor. Subsequently, the temperature in the reactor was increased from 250° C. to 280° C. over 3 hours. This temperature was maintained and the pressure was reduced from normal pressure to an absolute pressure of 40 Pa. While this pressure was maintained, heating was continued for additional two hours, to carry out polycondensation reaction. After the termination of the polycondensation reaction, the pressure in the reactor was returned to normal pressure with nitrogen gas. The resulting polyester was discharged in a strand form through an outlet opening at the bottom of the reactor. The strand was cooled and cut, providing polyester pellets. The intrinsic viscosity, hue, haze value and Δb of the thus obtained polyester are shown in Table 1.

Example 3

Preparation of Polycondensation Catalyst B 500 g of hydrotalcite obtained in Reference Example 2 was dispersed in 1.1 L of ethylene glycol maintained at a temperature of 75-85° C. to provide a dispersion. 177.8 g of titanium tetraisopropoxide (Ti(OC₃H₇)₄) was dropwise added to the dispersion with stirring over a period of 2 hours. After the addition, the resulting mixture was aged for one hour to provide a solution. Subsequently, 45 g of water, an amount four times in moles the amount of the titanium tetraisopropoxide, was added to the solution, followed by aging for 4 hours to form a coat layer of titanic acid on the surface of particles of hydrotalcite, thereby providing a dispersion of particles of hydrotalcite having a coat layer thereon (polycondensation catalyst B) in the ethylene glycol according to the invention.

The proportion of the polycondensation catalyst in the ethylene glycol dispersion was 30 parts by weight per 100 parts by weight of the ethylene glycol dispersion. The sedimentation rate of this ethylene glycol dispersion is shown in Table 1. The proportion of coat of titanic acid in the polycondensation catalyst was 10 parts by weight in terms of TiO₂ per 100 parts by weight of hydrotalcite.

Production of Polyester C 13.6 g (0.070 mol) of dimethyl terephthalate, 10.0 g (0.16 mol) of ethylene glycol, 0.022 g of calcium acetate dihydrate and 0.0039 g of ethylene glycol dispersion of polycondensation catalyst B (0.0117 g as polycondensation catalyst, i.e., 2.1×10⁻⁵ mol; 0.03 parts by mole per 100 parts by mole of dimethyl terephthalate) were placed in a glass reactor with a side pipe. Then, a part of the reactor was soaked in an oil bath at 197° C. so that the dimethyl terephthalate was dissolved in the ethylene glycol. A capillary was inserted into a reaction tube so that it reached the bottom of the reactor. While distilling most of resulting methanol by blowing nitrogen into the reactor for 1 hour using this capillary, heating was continued for 2 hours to yield an oligomer containing BHET.

Subsequently, when the resulting reaction mixture was heated at 222° C. for 15 minutes, ethylene glycol started to be distilled and polycondensation started. Thereafter, the temperature was increased to 283° C. When this temperature was maintained, ethylene glycol was further distilled and the polycondensation progressed. Ten minutes later, the reduction of pressure was started and the pressure was reduced to 27 Pa or lower over 15 minutes. Then, the polycondensation was terminated in 3 hours. After the termination of the polycondensation reaction, the pressure in the reactor was returned to normal pressure with nitrogen gas. The resulting polyester was discharged in a strand form through an outlet opening at the bottom of the reactor. The strand was cooled and cut, yielding polyester pellets. The intrinsic viscosity, hue, haze value and Δb of the thus obtained polyester are shown in Table 1.

Example 4

Production of Polyester d 43 g (0.26 mol) of terephthalic acid and 19 g (0.31 mol) of ethylene glycol were placed in a reactor and stirred under a nitrogen atmosphere to prepare a slurry. An esterification reaction was performed over 4 hours while the temperature in the reactor was kept at 250° C. and the relative pressure based on the atmospheric pressure was kept at 1.2×10⁵ Pa. 50 g of the thus obtained low-molecular weight oligomer was transferred to a polycondensation reactor held at 250° C. and normal pressure under a nitrogen gas atmosphere.

0.073 g of ethylene glycol dispersion of polycondensation catalyst B (0.0218 g as polycondensation catalyst, i.e., 3.9×10⁻⁵ mol; 0.015 parts by mole per 100 parts by mole of terephthalic acid component used in polycondensation) was dispersed in ethylene glycol to prepare a slurry, and the resulting slurry was added to the polycondensation reactor. Subsequently, the temperature in the reactor was increased from 250° C. to 280° C. over 3 hours. This temperature was maintained and the pressure was reduced from normal pressure to an absolute pressure of 40 Pa. While this pressure was maintained, heating was continued for additional two hours, to carry out polycondensation reaction. After the termination of the polycondensation reaction, the pressure in the reactor was returned to normal pressure with nitrogen gas. The resulting polyester was discharged in a strand form through an outlet opening at the bottom of the reactor. The strand was cooled and cut, providing polyester pellets. The intrinsic viscosity, hue, haze value and Δb of the thus obtained polyester are shown in Table 1.

Preparation of Second Polycondensation Catalysts and Examples of Production of Polyester Using the Catalysts Example 5

Preparation of Polycondensation Catalyst C 1107 g of magnesium hydroxide obtained in Reference Example 1 was dispersed in 2.5 L of ethylene glycol maintained at a temperature of 75-85° C. to provide a dispersion. 191.7 g of tetraethyl orthosilicate ($Si(OC_2H_5)_4$) was dropwise added to the dispersion with stirring over a period of 2 hours. After the addition, the resulting mixture was aged for one hour to provide a solution. Subsequently, 66 g of water, an amount four times in moles the amount of the tetraethyl orthosilicate, was added to the solution, followed by aging for 6 hours, thereby forming an inner coat layer of silicon oxide on the surface of particles of magnesium hydroxide.

While the resulting ethylene glycol dispersion of magnesium hydroxide having the inner coat layer was stirred, 395.0 g of titanium tetraisopropoxide ($Ti(OC_3H_7)_4$) was dropwise added to the dispersion over a period of 2 hours. After the addition, the resulting mixture was aged for one hour. Then, 100 g of water, an amount four times in moles the amount of the titanium tetraisopropoxide, was added to the mixture, followed by aging for 4 hours to form an outer coat layer of titanic acid on the inner coat layer, thereby providing a dispersion of particles of magnesium hydroxide having the inner and the outer coat layer thereon (polycondensation catalyst C) in the ethylene glycol according to the invention.

In the polycondensation catalyst thus obtained, the proportion of the inner coat layer formed of silicon oxide was 5 parts by weight in terms of $SiO_2$ per 100 parts by weight of magnesium hydroxide and the proportion of the outer coat layer formed of titanic acid was 10 parts by weight in terms of $TiO_2$ per 100 parts by weight of magnesium hydroxide. The sedimentation rate of the ethylene glycol dispersion of the polycondensation catalyst is shown in Table 1.

Production of Polyester E

The polycondensation catalyst C was used, and otherwise in the same manner as Example 1, polyester was obtained. The intrinsic viscosity, hue, haze value and Ab of the thus obtained polyester are shown in Table 1.

Example 6

Preparation of Polycondensation Catalyst D 1107 g of magnesium hydroxide obtained in Reference Example 1 was dispersed in 2.5 L of ethylene glycol maintained at a temperature of 75-85° C. to provide a dispersion. 221.4 g of aluminum isopropoxide ($Al(OC_3H_7)_3$) was dropwise added to the dispersion with stirring over a period of 2 hours. After the addition, the resulting mixture was aged for one hour to provide a solution. Subsequently, 78.2 g of water, an amount three times in moles the amount of the aluminum isopropoxide, was added to the solution, followed by aging for 6 hours, thereby forming an inner coat layer of aluminum oxide on the surface of particles of magnesium hydroxide.

While the resulting ethylene glycol dispersion of magnesium hydroxide having the inner coat layer was stirred, 395.0 g of titanium tetraisopropoxide ($Ti(OC_3H_7)_4$) was dropwise added to the dispersion over a period of 2 hours. After the addition, the resulting mixture was aged for one hour. Then, 100 g of water, an amount four times in moles the amount of the titanium tetraisopropoxide, was added to the mixture, followed by aging for 4 hours to form an outer coat layer of titanic acid on the inner coat layer, thereby providing a dispersion of particles of magnesium hydroxide having the inner and the outer coat layer thereon (polycondensation catalyst D) in the ethylene glycol according to the invention.

In the polycondensation catalyst thus obtained, the proportion of the inner coat layer formed of aluminum oxide was 5 parts by weight in terms of $Al_2O_3$ per 100 parts by weight of magnesium hydroxide and the proportion of the outer coat layer formed of titanic acid was 10 parts by weight in terms of $TiO_2$ per 100 parts by weight of magnesium hydroxide. The sedimentation rate of the ethylene glycol dispersion of the polycondensation catalyst is shown in Table 1.

Production of Polyester F

The polycondensation catalyst D was used, and otherwise in the same manner as Example 1, polyester was obtained. The intrinsic viscosity, hue, haze value and Δb of the thus obtained polyester are shown in Table 1.

Example 7

Preparation of Polycondensation Catalyst E 1107 g of magnesium hydroxide obtained in Reference Example 1 was dispersed in 2.5 L of ethylene glycol maintained at a temperature of 75-85° C. to provide a dispersion. 147.0 g of zirconium n-propoxide ($Zr(OC_3H_7)_4$) was dropwise added to the dispersion with stirring over a period of 2 hours. After the addition, the resulting mixture was aged for one hour to provide a solution. Subsequently, 85.9 g of water, an amount four times in moles the amount of the zirconium n-propoxide, was added to the solution, followed by aging for 6 hours, thereby forming an inner coat layer of zirconium oxide on the surface of particles of magnesium hydroxide.

While the resulting ethylene glycol dispersion of magnesium hydroxide having the inner coat layer was stirred, 395.0 g of titanium tetraisopropoxide ($Ti(OC_3H_7)_4$) was dropwise added to the dispersion over a period of 2 hours. After the addition, the resulting mixture was aged for one hour. Then, 100 g of water, an amount four times in moles the amount of the titanium tetraisopropoxide, was added to the mixture, followed by aging for 4 hours to form an outer coat layer of titanic acid on the inner coat layer, thereby providing a dispersion of particles of magnesium hydroxide having the inner and the outer coat layer thereon (polycondensation catalyst E) in the ethylene glycol according to the invention.

In the polycondensation catalyst thus obtained, the proportion of the inner coat layer formed of zirconium oxide was 5 parts by weight in terms of $ZrO_2$ per 100 parts by weight of magnesium hydroxide and the proportion of the outer coat layer formed of titanic acid was 10 parts by weight in terms of $TiO_2$ per 100 parts by weight of magnesium hydroxide. The sedimentation rate of the ethylene glycol dispersion of the polycondensation catalyst is shown in Table 1.

Production of Polyester G

The polycondensation catalyst E was used, and otherwise in the same manner as Example 1, polyester was obtained. The intrinsic viscosity, hue, haze value and Δb of the thus obtained polyester are shown in Table 1.

Example 8

Preparation of Polycondensation Catalyst F 1107 g of magnesium hydroxide obtained in Reference Example 1 was dispersed in 2.5 L of ethylene glycol maintained at a temperature of 75-85° C. to provide a dispersion. A mixed solution of 64.0 g of tetraethyl orthosilicate (Si$(OC_2H_5)_4$), 74.0 g of aluminum isopropoxide (Al$(OC_3H_7)_3$) and 49.1 g of zirconium n-propoxide (Zr$(OC_3H_7)_4$) was dropwise added to the dispersion with stirring over a period of 2 hours. After the addition, the resulting mixture was aged for one hour to provide a solution. Subsequently, 52.5 g of water was added to the solution, followed by aging for 6 hours, thereby forming an inner coat layer of composite oxide of silicon, aluminum and zirconium on the surface of particles of magnesium hydroxide.

While the resulting ethylene glycol dispersion of magnesium hydroxide having the inner coat layer was stirred, 395.0 g of titanium tetraisopropoxide (Ti$(OC_3H_7)_4$) was dropwise added to the dispersion over a period of 2 hours. After the addition, the resulting mixture was aged for one hour. Then, 100 g of water, an amount four times in moles the amount of the titanium tetraisopropoxide, was added to the mixture, followed by aging for 4 hours to form an outer coat layer of titanic acid on the inner coat layer, thereby providing a dispersion of particles of magnesium hydroxide having the inner and the outer coat layer thereon (polycondensation catalyst F) in the ethylene glycol according to the invention.

In the polycondensation catalyst thus obtained, the proportion of the inner coat layer formed of composite oxide of silicon, aluminum and zirconium was 5 parts by weight in terms of $SiO_2$, $Al_2O_3$ and $ZrO_2$, respectively, per 100 parts by weight of magnesium hydroxide and the proportion of the outer coat layer formed of titanic acid was 10 parts by weight in terms of $TiO_2$ per 100 parts by weight of magnesium hydroxide. The sedimentation rate of the ethylene glycol dispersion of the polycondensation catalyst is shown in Table 1.

Production of Polyester H

The polycondensation catalyst F was used, and otherwise in the same manner as Example 1, polyester was obtained. The intrinsic viscosity, hue, haze value and Δb of the thus obtained polyester are shown in Table 1.

Example 9

Preparation of Polycondensation Catalyst G 500 g of hydrotalcite obtained in Reference Example 2 was dispersed in 1.1 L of ethylene glycol maintained at a temperature of 75-85° C. to provide a dispersion. 86.7 g of tetraethyl orthosilicate was dropwise added to the dispersion with stirring over a period of 2 hours. After the addition, the mixture was aged for one hour to provide a solution. Subsequently, 30 g of water, an amount four times in moles the amount of the tetraethyl orthosilicate, was added to the solution, followed by aging for 6 hours, thereby forming an inner coat layer of silicon oxide on the surface of particles of hydrotalcite.

While the resulting ethylene glycol dispersion of hydrotalcite having the inner coat layer was stirred, 177.8 g of titanium tetraisopropoxide (Ti$(OC_3H_7)_4$) was dropwise added to the dispersion over a period of 2 hours. After the addition, the resulting mixture was aged for one hour. Then, 45 g of water, an amount four times in moles the amount of the titanium tetraisopropoxide, was added to the mixture, followed by aging for 4 hours to form an outer coat layer of titanic acid on the inner coat layer, thereby providing a dispersion of particles of hydrotalcite having the inner and the outer coat layer thereon (polycondensation catalyst G) in the ethylene glycol according to the invention.

In the polycondensation catalyst thus obtained, the proportion of the inner coat layer formed of silicon oxide was 5 parts by weight in terms of $SiO_2$ per 100 parts by weight of hydrotalcite and the proportion of the outer coat layer formed of titanic acid was 10 parts by weight in terms of $TiO_2$ per 100 parts by weight of hydrotalcite. The sedimentation rate of the ethylene glycol dispersion of the polycondensation catalyst (G) is shown in Table 1.

Production of Polyester I

The polycondensation catalyst G was used, and otherwise in the same manner as Example 1, polyester was obtained. The intrinsic viscosity, hue, haze value and Δb of the thus obtained polyester are shown in Table 1.

Example 10

Preparation of Polycondensation Catalyst H 500 g of hydrotalcite obtained in Reference Example 2 was dispersed in 1.1 L of ethylene glycol maintained at a temperature of 75-85° C. to provide a dispersion. 100.0 g of aluminum isopropoxide (Al$(OC_3H_7)_3$) was dropwise added to the dispersion with stirring over a period of 2 hours. After the addition, the resulting mixture was aged for one hour to provide a solution. Subsequently, 26.5 g of water, an amount three times in moles the amount of the aluminum isopropoxide, was added to the solution, followed by aging for 6 hours, thereby forming an inner coat layer of aluminum oxide on the surface of particles of hydrotalcite.

While the resulting ethylene glycol dispersion of hydrotalcite having the inner coat layer was stirred, 177.8 g of titanium tetraisopropoxide (Ti$(OC_3H_7)_4$) was dropwise added to the dispersion over a period of 2 hours. After the addition, the resulting mixture was aged for one hour. Then, 45 g of water, an amount four times in moles the amount of the titanium tetraisopropoxide, was added to the mixture, followed by aging for 4 hours to form an outer coat layer of titanic acid on the inner coat layer, thereby providing a dispersion of particles of hydrotalcite having the inner and the outer coat layer thereon (polycondensation catalyst H) in the ethylene glycol according to the invention.

In the polycondensation catalyst thus obtained, the proportion of the inner coat layer formed of aluminum oxide was 5 parts by weight in terms of $Al_2O_3$ per 100 parts by weight of hydrotalcite and the proportion of the outer coat layer formed of titanic acid was 10 parts by weight in terms of $TiO_2$ per 100 parts by weight of hydrotalcite. The sedimentation rate of the ethylene glycol dispersion of the polycondensation catalyst (H) is shown in Table 1.

Production of Polyester J

The polycondensation catalyst H was used, and otherwise in the same manner as Example 1, polyester was obtained. The intrinsic viscosity, hue, haze value and Δb of the thus obtained polyester are shown in Table 1.

Example 11

Preparation of Polycondensation Catalyst I 500 g of hydrotalcite obtained in Reference Example 2 was dispersed in 1.1 L of ethylene glycol maintained at a temperature of 75-85° C. to provide a dispersion. 66.4 g of zirconium n-propoxide ($Zr(OC_3H_7)_4$) was dropwise added to the dispersion with stirring over a period of 2 hours. After the addition, the resulting mixture was aged for one hour to provide a solution. Subsequently, 14.6 g of water, an amount four times in moles the amount of the zirconium n-propoxide, was added to the solution, followed by aging for 6 hours, thereby forming an inner coat layer of zirconium oxide on the surface of particles of hydrotalcite.

While the resulting ethylene glycol dispersion of hydrotalcite having the inner coat layer thereon was stirred, 177.8 g of titanium tetraisopropoxide ($Ti(OC_3H_7)_4$) was dropwise added to the dispersion over a period of 2 hours. After the addition, the resulting mixture was aged for one hour. Then, 45 g of water, an amount four times in moles the amount of the titanium tetraisopropoxide, was added to the mixture, followed by aging for 4 hours to form an outer coat layer of titanic acid on the inner coat layer of particles of hydrotalcite, thereby providing a dispersion of particles of hydrotalcite having the inner and the outer coat layer thereon (polycondensation catalyst H) in the ethylene glycol according to the invention.

In the polycondensation catalyst thus obtained, the proportion of the inner coat layer formed of zirconium oxide was 5 parts by weight in terms of $ZrO_2$ per 100 parts by weight of hydrotalcite and the proportion of the outer coat layer formed of titanic acid was 10 parts by weight in terms of $TiO_2$ per 100 parts by weight of hydrotalcite. The sedimentation rate of the ethylene glycol dispersion of the polycondensation catalyst (I) is shown in Table 1.

Production of Polyester K

The polycondensation catalyst I was used, and otherwise in the same manner as Example 1, polyester was obtained. The intrinsic viscosity, hue, haze value and Δb of the thus obtained polyester are shown in Table 1.

Example 12

Preparation of Polycondensation Catalyst J 500 g of hydrotalcite obtained in Reference Example 2 was dispersed in 1.1 L of ethylene glycol maintained at a temperature of 75-85° C. to provide a dispersion. A mixed solution of 29.0 g of tetraethyl orthosilicate ($Si(OC_2H_5)_4$), 33.4 g of aluminum isopropoxide ($Al(OC_3H_7)_3$) and 22.2 g of zirconium n-propoxide ($Zr(OC_3H_7)_4$) was dropwise added to the dispersion with stirring over a period of 2 hours. After the addition, the resulting mixture was aged for one hour to provide a solution. Subsequently, 23.7 g of water was added to the solution, followed by aging for 6 hours, thereby forming an inner coat layer of composite oxide of silicon, aluminum and zirconium on the surface of particles of hydrotalcite.

While the resulting ethylene glycol dispersion of particles of hydrotalcite having the inner coat layer thereon was stirred, 177.8 g of titanium tetraisopropoxide ($Ti(OC_3H_7)_4$) was dropwise added to the dispersion over a period of 2 hours. After the addition, the resulting mixture was aged for one hour. Then, 45 g of water, an amount four times in moles the amount of the titanium tetraisopropoxide, was added to the mixture, followed by aging for 4 hours to form an outer coat layer of titanic acid on the inner coat layer of particles of hydrotalcite, thereby providing a dispersion of particles of hydrotalcite having the inner and the outer coat layer thereon (polycondensation catalyst J) in the ethylene glycol according to the invention.

In the polycondensation catalyst thus obtained, the proportion of the inner coat layer formed of composite oxide of silicon, aluminum and zirconium was 5 parts by weight in terms of $SiO_2$, $Al_2O_3$ and $ZrO_2$, respectively, per 100 parts by weight of hydrotalcite and the proportion of the outer coat layer formed of titanic acid was 10 parts by weight in terms of $TiO_2$ per 100 parts by weight of hydrotalcite. The sedimentation rate of the ethylene glycol dispersion of the polycondensation catalyst (J) is shown in Table 1.

Production of Polyester I

The polycondensation catalyst J was used, and otherwise in the same manner as Example 1, polyester was obtained. The intrinsic viscosity, hue, haze value and Δb of the thus obtained polyester are shown in Table 1.

Comparative Example 1

Preparation of Polycondensation Catalyst K 1.6 L of aqueous solution of titanium tetrachloride (69.2 g/L in terms of $TiO_2$) and 1.6 L of aqueous solution of sodium hydroxide (99.6 g/L in terms of NaOH) were prepared. 9.0 L of aqueous slurry of magnesium hydroxide (123 g/L) obtained in Reference Example 1 was placed in a 25 L capacity reactor, and then the aqueous solution of titanium tetrachloride and the aqueous solution of sodium hydroxide were added dropwise at the same time over a period of two hours to the aqueous slurry of magnesium hydroxide in such a manner that the resulting slurry had a pH of 10.0. After the addition, the slurry was aged for 1 hour to form an inner coat layer of titanic acid on the surface of particles of magnesium hydroxide.

The thus obtained aqueous slurry of particles of magnesium hydroxide having the inner coat layer of titanic acid thereon was filtered, and the obtained particles were washed with water, dried and pulverized to provide a polycondensation catalyst K.

In the polycondensation catalyst thus obtained, the proportion of the coat layer of titanic acid was 10 parts by weight in terms of $TiO_2$ per 100 parts by weight of magnesium hydroxide. The sedimentation rate of the aqueous slurry of the polycondensation catalyst is shown in Table 1.

Production of Polyester M

The polycondensation catalyst K was used, and otherwise in the same manner as Example 1, polyester was obtained. The intrinsic viscosity, hue, haze value and Δb of the thus obtained polyester are shown in Table 1.

Comparative Example 2

Preparation of Polycondensation Catalyst L 0.72 L of aqueous solution of titanium tetrachloride (69.4 g/L in terms of $TiO_2$) and 0.72 L of aqueous solution of sodium hydroxide (100 g/L in terms of NaOH) were prepared. 5.0 L of aqueous slurry of hydrotalcite (100 g/L) obtained in Reference Example 2 was placed in a 25 L capacity reactor, and then the aqueous solution of titanium tetrachloride and the aqueous solution of sodium hydroxide were added dropwise at the same time over a period of two hours to the aqueous slurry of hydrotalcite in such a manner that the resulting slurry had a pH of 9.0. After the addition, the slurry was aged for 1 hour to form a coat layer of titanic acid on the surface of particles of hydrotalcite.

The thus treated hydrotalcite was collected by filtration from the aqueous slurry, washed with water, dried and pulverized to provide a polycondensation catalyst L.

In the polycondensation catalyst thus obtained, the proportion of coat layer formed of titanic acid was 10 parts by weight in terms of $TiO_2$ per 100 parts by weight of hydrotalcite. The sedimentation rate of the aqueous slurry of the polycondensation catalyst is shown in Table 1.

Production of Polyester N

The polycondensation catalyst L was used, and otherwise in the same manner as Example 1, polyester was obtained. The intrinsic viscosity, hue, haze value and Δb of the thus obtained polyester are shown in Table 1.

Comparative Example 3

Production of Polyester O

Polyester was obtained in the same manner as Example 1 except for using 0.0061 g ($2.1 \times 10^{-5}$ mol, 0.03 parts by mol per 100 parts by mol of dimethyl terephthalate) of antimony trioxide instead of polycondensation catalyst A. The intrinsic viscosity, hue and haze value of the thus obtained polyester are shown in Table 1.

Comparative Example 4

Production of Polyester P

Polyester was obtained in the same manner as Example 2 except for using 0.0114 g ($3.9 \times 10^{-5}$ mol, 0.015 parts by mol per 100 parts by mol of dimethyl terephthalate) of antimony trioxide instead of polycondensation catalyst A. The intrinsic viscosity, hue and haze value of the thus obtained polyester are shown in Table 1.

TABLE 1

| | Polyester | Catalyst | Intrinsic Viscosity (dL/g) | Hue L | Hue a | Hue b | Haze (%) | Sedimentation Rate (%) | Δb |
|---|---|---|---|---|---|---|---|---|---|
| Example 1 | a | A | 0.67 | 94.2 | −2.0 | +1.5 | 4.0 | 12 | 8.5 |
| Example 2 | b | A | 0.67 | 94.1 | −2.2 | +1.9 | 4.3 | | 8.6 |
| Example 3 | c | B | 0.70 | 91.0 | −1.8 | +1.1 | 3.8 | 15 | 8.9 |
| Example 4 | d | B | 0.68 | 90.0 | −1.9 | +1.1 | 3.9 | | 8.7 |
| Example 5 | e | C | 0.70 | 93.0 | −1.7 | +1.6 | 3.6 | 18 | 8.8 |
| Example 6 | f | D | 0.64 | 88.9 | −2.0 | +1.9 | 4.3 | 20 | 9.2 |
| Example 7 | g | E | 0.68 | 91.0 | −1.9 | +1.7 | 4.2 | 22 | 9.1 |
| Example 8 | h | F | 0.65 | 89.6 | −2.2 | +1.6 | 3.9 | 21 | 8.9 |
| Example 9 | i | G | 0.65 | 90.3 | −2.3 | +1.2 | 4.1 | 19 | 8.4 |
| Example 10 | j | H | 0.71 | 91.2 | −2.1 | +1.7 | 4.3 | 20 | 8.7 |
| Example 11 | k | I | 0.64 | 90.5 | −2.4 | +1.3 | 4.0 | 22 | 8.8 |
| Example 12 | l | J | 0.66 | 91.5 | −2.3 | +1.2 | 4.5 | 21 | 8.7 |
| Comparative 1 | m | K | 0.68 | 94.4 | −2.0 | +1.4 | 4.2 | 45 | 10.3 |
| Comparative 2 | n | L | 0.72 | 91.3 | −1.9 | +1.1 | 3.8 | 43 | 10.7 |
| Comparative 3 | o | $Sb_2O_3$ | 0.72 | 91.0 | −2.2 | +1.9 | 4.0 | — | 8.5 |
| Comparative 4 | p | $Sb_2O_3$ | 0.69 | 90.3 | −2.3 | +1.9 | 4.3 | — | 8.4 |

The invention claimed is:

1. A method for producing a catalyst for producing polyester by an esterification reaction or a transesterification reaction between a dicarboxylic acid or an ester-forming derivative thereof and a glycol,
   the method comprising:
   (a) preparing a dispersion of particles of a solid base of magnesium hydroxide or hydrotalcite in an aliphatic dihydric alcohol,
   (b) adding an organic titanium compound dropwise to the dispersion and then stirring,
   (c) aging the dispersion, and
   (d) hydrolyzing the organic titanium compound by adding water to the dispersion in an amount of at least four times, in terms of moles, per the amount of the organic titanium compound to form a coat layer of titanic acid on a surface of the particles of the solid base to obtain the catalyst,
   wherein the method for producing the catalyst excludes use of an aliphatic monohydric alcohol.

2. The method according to claim 1, wherein the aliphatic dihydric alcohol is ethylene glycol.

3. The method according to claim 1, wherein the organic titanium compound is a titanium tetraalkoxide.

4. The method according to claim 1, wherein the amount of the water is four times, in terms of moles, per the amount of the organic titanium compound.

* * * * *